(12) United States Patent
Fonteyn

(10) Patent No.: US 11,084,887 B2
(45) Date of Patent: Aug. 10, 2021

(54) STARCH FOR PULPY TEXTURES

(71) Applicant: Dirk Fonteyn, Bonheiden (BE)

(72) Inventor: Dirk Fonteyn, Bonheiden (BE)

(73) Assignee: Cargill, Incorporated, Wayzata, MN (US)

( * ) Notice: Subject to any disclaimer, the term of this patent is extended or adjusted under 35 U.S.C. 154(b) by 276 days.

(21) Appl. No.: 15/735,656

(22) PCT Filed: Jun. 10, 2016

(86) PCT No.: PCT/US2016/036815
§ 371 (c)(1),
(2) Date: Dec. 12, 2017

(87) PCT Pub. No.: WO2016/205081
PCT Pub. Date: Dec. 22, 2016

(65) Prior Publication Data
US 2018/0355067 A1 Dec. 13, 2018

Related U.S. Application Data

(63) Continuation of application No. PCT/US2016/036815, filed on Jun. 10, 2016.

(30) Foreign Application Priority Data

Jun. 15, 2010 (EP) .................................... 15172093

(51) Int. Cl.
*C08B 31/00* (2006.01)
*A23L 29/219* (2016.01)
(Continued)

(52) U.S. Cl.
CPC ............ *C08B 31/003* (2013.01); *A23C 19/09* (2013.01); *A23L 2/02* (2013.01); *A23L 2/52* (2013.01);
(Continued)

(58) Field of Classification Search
None
See application file for complete search history.

(56) References Cited

U.S. PATENT DOCUMENTS

| 4,219,646 A | 8/1980 | Rubens |
| 4,228,199 A | 10/1980 | Chiu et al. |

(Continued)

FOREIGN PATENT DOCUMENTS

| CN | 1067897 A | 1/1993 |
| CN | 101215334 B | 12/2012 |

(Continued)

*Primary Examiner* — Stefanie J Cohen

(57) ABSTRACT

The present invention relates to a pregelatinized starch having a Brabender hot paste viscosity (HPV) of at least 200 BU when measured at a pH of at most 4.5. The starch is used to provide a viscosity and pulpy texture to a food product and is resistant to processing under extreme conditions of heat, acidity and shear. Examples of food products which highly benefit from the properties of the starch include compotes; sauces and preparations based on tomatoes; meat sauces; gravies; baby foods; puddings; cereals; fruit-juices and fruit-drinks; fruit sauces such as apple sauce; confectionary such as textured gum drops; cookies, crackers, cakes and pastries comprising fruits; soups; and dry powdered mixes which may be reconstituted with water.

14 Claims, 4 Drawing Sheets

(51) Int. Cl.
*C08L 3/04* (2006.01)
*A23L 27/60* (2016.01)
*A23L 23/00* (2016.01)
*A23C 19/09* (2006.01)
*A23L 2/02* (2006.01)
*A23L 2/52* (2006.01)

(52) U.S. Cl.
CPC .............. *A23L 23/00* (2016.08); *A23L 27/63* (2016.08); *A23L 29/219* (2016.08); *C08L 3/04* (2013.01); *A23V 2002/00* (2013.01)

(56) References Cited

U.S. PATENT DOCUMENTS

| | | | |
|---|---|---|---|
| 4,369,308 | A | 1/1983 | Trubiano et al. |
| 6,010,574 | A | 1/2000 | Jeffcoat |
| 7,422,638 | B2 | 9/2008 | Trksak |
| 2002/0090446 | A1* | 7/2002 | Jeffcoat ................. A23L 2/62 426/661 |
| 2003/0180430 | A1* | 9/2003 | Fryirs ................. A21D 2/186 426/589 |

FOREIGN PATENT DOCUMENTS

| | | |
|---|---|---|
| EP | 1482812 A1 | 12/2004 |
| EP | 1510527 A1 | 3/2005 |
| JP | 0923826 A | 1/1997 |
| JP | 11506798 A | 6/1999 |
| JP | 2003144062 A | 5/2003 |
| JP | 2003144109 A | 5/2003 |
| JP | 2005133072 A | 5/2005 |
| JP | 2008530349 A | 8/2008 |
| WO | 9640793 W | 12/1996 |
| WO | 1996040793 W | 12/1996 |
| WO | WO1996/040793 | 12/1996 |
| WO | 2003075681 A1 | 4/2003 |
| WO | 03075681 W | 9/2003 |
| WO | 2005026212 A1 | 3/2005 |

* cited by examiner

STARCH FOR PULPY TEXTURES

CROSS REFERENCE TO RELATED APPLICATIONS

This application is a national phase application of PCT/US2016/036815, filed 10 Jun. 2016, entitled STARCH FOR PULPY TEXTURES, which claims the benefit of priority to European Application No. 15172093.5 filed 15 Jun. 2015, entitled STARCH FOR PULPY TEXTURES, which are hereby incorporated by reference in their entirety.

The present invention relates to a pregelatinized starch that provides a pulpy texture to a food product, to a process for manufacturing thereof and to food products containing said starch.

BACKGROUND OF THE INVENTION

The appearance and overall consumer appeal of many processed food products is greatly enhanced when they are characterized by the presence of a pulpy texture. For example home-made tomato sauces or tomato concassées exhibit a pulpy texture because of the presence of small, but perceptible fractions of tomato flesh in suspension therein. Such pulpy texture is also obtained upon preparation of stewed or mashed fruits or porridges.

Starches have been used to mimic the pulpy texture in various food products which usually have a thick and pasty character. EP0026102 discloses the use of a "starch-sponge" obtained by cooling a starch paste to its freezing point and drying it, to provide a pulpy texture to a tomato sauce. EP1051917 proposes another solution where starch containing fruit or vegetable pulp was dried to obtain agglomerated flakes which upon boiling and cooking develop a pulpy texture.

WO 2003/075681 provides a chemically cross-linked and/or substituted starch which is not pregelatinized and is stable to acid conditions between pH 3 and pH 7. Said starch has a smooth and creamy mouthfeel and no pulpy texture.

WO 2005/026212 discloses a stabilized starch which is not pregelatinized, said starch having improved viscosity stability and improved setting properties without however being able to provide a pulpy texture.

Further disclosure of starches which provide smooth and creamy textures rather than pulpy textures are provided by EP 1 510 527; WO 1996/40793; U.S. Pat. Nos. 4,369,308 and 7,228,199. None of these documents discloses a starch having acceptable rheological properties, especially at acidic pHs.

Therefore, in addition of being time-consuming, cumbersome and costly to manufacture, these solutions have another serious deficiency. It was observed, that their resistance to heat, acidity and agitation conditions is poor and food systems processed under such conditions are seriously affected both in terms of texture but also in terms of stability. For example, during the processing of products having an acidic pH such as tomato sauces or in the case of products processed at high temperatures such as soups or canned food, the current starch-based solutions undergo a viscosity "breakdown". This is manifested by a loss of viscosity after cooking or baking resulting in a loss of both useable thickening power and textural properties. Another disadvantage may be evidenced by the thinning of starch stabilized fruit pastes in certain bakery products such as fruit filled tarts. This thinning often results in a "boil-out" or puncture of the pastry shell during baking thereby detracting from the appearance of the tart.

There is therefore a need for a starch which can provide the pulpy texture to a food product while developing an optimum viscosity profile. In particular there is a need for starches that can provide and maintain the pulpy texture under heat, acidity and agitation conditions. More in particular there is a need for a starch which can provide pulpy textures and which develops an optimum viscosity profile when processed at high temperatures, acidic pHs and under high shear conditions. There is also a need for a starch which has a lesser viscosity breakdown under acidic pHs than that of the known starches. There is also a need for a food product which maintains its pulpy texture after pasteurisation or sterilisation.

SUMMARY OF THE INVENTION

In an attempt to meet the specified aims, the present invention proposes a pregelatinized starch capable of forming a pulpy texture, the starch having a Brabender hot-paste-viscosity (HPV) of at least 200 BU when measured at a pH of at most 4.5, preferably at a pH of 3.0.

The present inventors observed that a starch according to the invention is able to provide and preserve a pulpy texture to e.g. a food product while conferring an optimum viscosity profile also. In addition, the starch of the invention is able to provide such outstanding characteristics to food products and maintain the texture during the processing thereof under extreme conditions of heat, acidity and shear.

DESCRIPTION OF THE FIGURES

FIGS. 3 and 4 show pictographs of the pulpy texture of an Italian style pasta sauce samples with and without the starch of the invention, before (FIGS. 3A-D) and after (FIGS. 4A-D) sterilization.

DETAILED DESCRIPTION OF THE INVENTION

Figure 1:
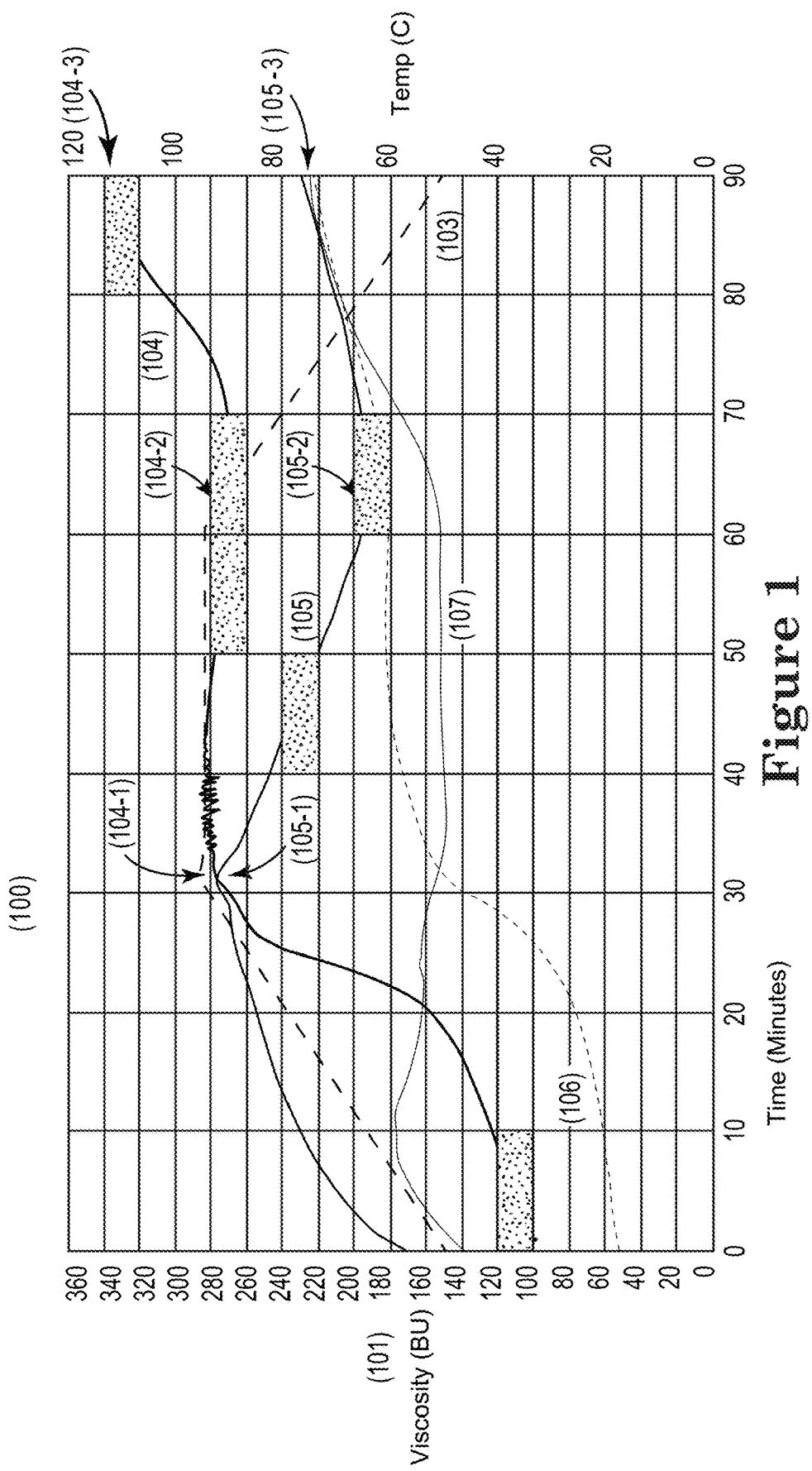
FIG. 1 shows Brabender viscosity curves characteristic to the starch of the invention and starches of the prior art.

The present invention relates to a pregelatinized starch capable of forming a pulpy texture and having a Brabender HPV of at least 200 BU when measured at a pH of at most 4.5, preferably at a pH of 3.0. The starch of the invention is a pregelatinized (also referred to in the art as gelatinized) starch, i.e. a starch which lost its polarization cross. Moreover, the starch of the invention may be granular or non-granular, preferably said starch is a non-granular starch, i.e. a starch which lost its granular structure. To inventors knowledge, the starch of the present invention (hereinafter referred to as "the inventive starch"), has viscosity-related properties never achieved hitherto by any other starch.

It is known that hydrogen bonds are responsible for the integrity of starch granules. When aqueous suspensions of starches are heated, the hydrogen bonds weaken; the starches swell and eventually fragment, rupture and collapse. When this happens, a significant drop in the viscosity typically occurs. Cross-linking reinforces the stability of the starch with chemical bonds which act as bridges between molecules. When a cross-linked starch is heated in water, the hydrogen bonds may be weakened or destroyed but the starch might be kept intact to varying degrees by the chemical bridges. An optimum amount of cross-links between the molecules of the starch but also an optimum distribution of said cross-links may thus provide resistance to viscosity breakdown and loss of texture when a specific set of processing conditions in terms of heat, acid or shear are applied. Without being bound to any theory, the present inventors believe that the inventive starches have an optimum amount and distributions of cross-links to ensure for an optimum stability thereof under extreme processing conditions of high temperature, acidity and mechanical shear. In contrast with the inventive starch, the known starches typically have an insufficient cross-linking level but also an ineffective distribution of the cross-links and they may thus suffer from viscosity breakdown and texture loss, especially under extreme processing conditions.

The present inventors succeeded in providing the inventive starch with an optimum amount of chemical cross-links and distribution thereof as evidenced by the superior viscosity curve characteristic to the starch. The viscosity of the inventive starch maintains after peaking a high value with little or no degradation or breakdown even after exposure to elevated temperature and strongly acidic pHs for extended periods of time. The benefit of having a uniquely high Brabender HPV characteristic to the inventive starch, may translate into an optimum thickening power and textural properties achievable under extreme conditions of heat, acidity and agitation.

Preferably, the Brabender HPV is at least 215 BU, more preferably at least 230 BU, even more preferably at least 245 BU, most preferably at least 250 BU when measured at a pH of at most 4.5, preferably at a pH of 3.0. Preferably, the Brabender HPV is between 200 and 300 BU, more preferably between 230 and 280 BU, most preferably between 250 and 270 BU. The inventors surprisingly observed that the inventive starches are able to maintain their superior viscosity properties under acidic pH while providing an optimum pulpy texture.

Preferably, the Brabender HPV is measured at a pH of at most 4.0, more preferably of at most 3.5. In a preferred embodiment, the Brabender HPV is measured at a pH of 3.0. Preferably, the Brabender HPV is measured at a temperature of at least 90° C., more preferably at a temperature of 95° C.

The organoleptic characteristics "pulpy" of e.g. a food product, is a sensory characterization of the texture which is characterized by the presence of coarse structured particles. Pulpy (or gritty) textures are in contrast to textures that may be called creamy or smooth. By texture is herein understood a group of physical and sensory properties associated with the structure of the product. Texture may be sensed by the tactile sense, commonly in the mouth, and in some instances may even be measured objectively as a function of mass, distance and time. Reference is given, in this context, to Römpp's Chemie Lexikon, 9th Edition, which defines "pulpy" (or "pulp"), a mushy mass which still contains coarser particles. According to ISO Standard 11036, "Sensory analysis—Methodology-Texture profile", pulpiness is a geometrical attribute and is characterized under the collective term "granularity" as that geometrical texture which is defined in relation to the sensation of size and shape of particles. According to this standard, by texture is to be understood all mechanical, geometrical and surface properties of a product which are perceived by mechanical, tactile and, possibly, visual and auditory receptors. For the sensory texture analysis, generally recognized methods of food product analysis have become common and laid down in extensive publications (e.g. Fliedner & Wilhelmi: "Grundlagen und Prüfverfahren der Nahrungsmittelsensorik", 1989, Behr's Verlag, Hamburg; Amerine et al.: "Principles of Sensory Evaluation of Food", 1965, Academic Press, New York; Moskowitz, "Food Texture", 1987, Marcel Deker, Inc., New York). In addition to these publications and the afore-mentioned ISO Standard 11036, also ISO Standard 11035 "Sensory analysis: Identification and selection of descriptors for establishing a sensory profile by a multidimensional approach" ought to be mentioned, according to which the performance of sensory panel tests and the properties and the choice of the panelists or examiners, respectively, necessary therefor are comprehensively determined.

The inventive starch is capable of forming a pulpy texture, i.e. the starch is capable of forming discrete particles or lumps having an appropriate size. This capability of the inventive starch can be visually determined, for example by dispersing under stirring a certain quantity of starch (e.g. one gram anhydrous weight) in distilled water (e.g. in an enough amount to give a total weight of 100 grams). The present inventors observed that the particles or lumps formed by the inventive starch survive even after extreme cooking and/or retorting, giving stability to the pulpy texture. The capability of the starch to provide pulpy textures may also be determined by measuring a granule swelling power (GSP) of the starch which can be calculated in accordance with the methodology of U.S. Pat. No. 1,178,025, included herein in its entirety by reference.

Preferably the inventive starch has a Brabender top viscosity (TV) of at least 150 BU, more preferably of at least 200 BU, even more preferably of at least 250 BU, most preferably of at least 270 BU, when measured at a pH of at most 4.5. Preferably, the Brabender TV is measured at a pH of at most 4.0, more preferably of at most 3.5. In a preferred embodiment, the Brabender TV is measured at a pH of 3.0. Preferably, the Brabender TV is measured at a temperature of at least 90° C., more preferably at a temperature of 95° C. Since one of the main uses of the inventive starch is in food products to optimize the viscosity and texture thereof, it is highly preferred that the food product develops a TV as high as possible under the manufacturing conditions. When said food product and thus the starch contained therein is subjected to further processing (e.g. further heat treatment such as during pasteurization or sterilization) it is also highly desirable that the TV is kept at the high level or even further increased. A lower TV which may result from the degradation of starch under the further processing conditions might result in the necessity to use higher amounts of starch in order to reach the same viscosity level. The present inventors surprisingly observed that the inventive starch develops a high TV and maintains it under extreme processing conditions and thus lower amounts may be utilized to manufacture the food product containing thereof.

Preferably, the inventive starch has a Brabender top viscosity breakdown (TVB) of at most 30 BU, more preferably of at most 25 BU, even more preferably of at most 20 BU, most preferably of at most 10 BU, when measured at a pH of at most 4.5. Preferably, the TVB is measured at a pH of at most 4.0, more preferably of at most 3.5. In a preferred embodiment, the TVB is measured at a pH of 3.0. The TVB is herein understood as the difference between the TV and the HPV, when the dispersed starch is processed under extreme conditions, e.g. the starch is kept for a reasonably long time period (e.g. 30 min) at high temperature (e.g. 95° C.) under acidic conditions (e.g. pH of 3.0). The reduced TVB of the inventive starch may illustrate its stability under extreme processing conditions while avoiding viscosity breakdown and texture loss. The present inventors surprisingly observed that none of the known starches had such low values of the TVB; most of the known starches when subjected to similar processing conditions result in significant viscosity breakdown and texture loss and thus values much higher than 30 BU of their characteristic TVB.

Preferably, the inventive starch has a Brabender top viscosity (TV) and a Brabender end viscosity (EV), wherein the EV is higher than TV. Preferably TV is at most 95% of the EV, more preferably at most 90% of the EV, most preferably at most 85% of the EV.

Preferably, the Brabender end viscosity (EV) of the inventive starch is at least 290 BU, more preferably of at least 300 BU, even more preferably of at least 320 BU, most preferably of at least 340 BU, when measured at a pH of at most 4.5. Preferably, the EV is measured at a pH of at most 4.0, more preferably of at most 3.5. In a preferred embodiment, the EV is measured at a pH of 3.0. Preferably, the EV is measured at a temperature of at least 90° C., more preferably at a temperature of 95° C. The EV is the viscosity characteristic to the starch at the end of a processing cycle, e.g. for a certain time period (e.g. 30 min) at high temperature (e.g. 95° C.) and under acidic conditions (e.g. pH of 3.0), and after cooling the starch to 50° C. For food products it is beneficial to utilize a starch having a high EV since such a starch may be used in a lower amount. The present inventors surprisingly observed that the inventive starch showed an EV higher than any starch known hitherto when processed under the same conditions of high temperature and acidic pH. One benefit which the inventive starch may thus provide is a reduction in the processing costs of a food product containing thereof since lower amounts may be needed to provide a certain viscosity and texture.

In a preferred embodiment, the inventive starch has a has a Brabender top viscosity (TV) and a Brabender end viscosity (EV), wherein the EV is higher than TV, wherein EV is at least 290 and wherein TV is at least 150. Preferably said TV is at least 200 BU, more preferably of at least 250 BU, most preferably of at least 270 BU. Preferably said EV is at least 300 BU, more preferably of at least 320 BU, most preferably of at least 340 BU. Preferably, TV and EV are measured at a pH of at most 4.5, more preferably of at most 4.0, even more preferably of at most 3.5. In a preferred embodiment, the TV and EV are measured at a pH of 3.0. Preferably, the TV and EV are measured at a temperature of at least 90° C., more preferably at a temperature of 95° C.

The invention further relates to a method for manufacturing the inventive starches, comprising the steps of:
a) Reacting a slurried granular starch with phosphoryl chloride ($POCl_3$) to induce a primary cross-linking to said starch, at a pH of between 10 and 12 and a temperature sufficiently low to maintain the starch in an essentially unswollen granular state;
b) Neutralizing the slurry to a pH of between 5 and 6.5;
c) Recovering and drying the primary cross-linked starch and mixing said dried starch with a powder of sodium trimetaphosphate (STMP) to obtain a dry powder mix;
d) reslurrying the dry powder mix in water at a pH of at least 9.0 and cooking the starch to pregelatinize said starch and drying the slurry while effecting a second cross-linking reaction on the primary cross-linked starch, and recovering the starch product.

The starch which may be used in the method of the present invention (hereinafter "the inventive method") include any granular starch in raw or modified form. Preferably, the starch is in its raw, non-modified form, i.e. it is a native starch. Said starches are preferably non-pregelatinized starches, i.e. starches exhibiting a polarization cross. Useful starches include those produced from corn, waxy maize, grain, sorghum, wheat, rice, potato, sago, tapioca, sweet potato, high amylose corn, or the like. Also included are the conversion products derived from any of the starch bases including, for example, dextrins prepared by the hydrolytic action of acid and/or heat, oxidized starches prepared by treatment with oxidants such as sodium hypochlorite, and fluidity or thin boiling starches prepared by enzyme conversion or by mild acid hydrolysis. Particularly preferred starches are corn, waxy maize and tapioca. Corn starch is mostly preferred. With the term "starch" is herein also understood "flour".

The starch is slurrified in water to obtain a slurry having a dry solids content of preferably at least 30%, more preferably at least 35%, most preferably at least 40%. Preferably, said dry solids content is between 30% and 55%, more preferably between 35% and 50%, most preferably between 40% and 45%. The pH of the slurry may be adjusted to a range of between 10 and 12 with any common alkali such as, for example, sodium hydroxide. The primary crosslinking of the starch is effected by adding the $POCl_3$ reagent in an amount of preferably between 0.01 and 0.2, more preferably between 0.02 and 0.1, most preferably 0.03 and 0.05 percent based on the dry weight of the starch. The primary cross-linking reaction is carried out for a reaction time of preferably at least 10 minutes, more preferably of at least 20 minutes, most preferably of at least 30 minutes. Preferably, said reaction time is between 10 and 180 minutes, more preferably between 20 and 120 minutes, most preferably between 30 and 60 minutes. The primary cross-linking reaction should be carried out at a temperature sufficiently low to maintain the starch in an essentially un-swollen granular state. Preferably, said temperature is adjusted with the range of between 20 and 60° C., more preferably between 25 and 50° C., most preferably between 30 and 40° C.

After achieving the desired primary cross-linking network, as evidence by monitoring Brabender viscosity curves, the reaction is stopped by neutralizing the slurry to a pH of between 5 and 6.5, preferably between 5 and 5.5 and the obtained primary cross-linked starch is recovered e.g. by filtration. Without being bound to any theory, the inventors believe that by carrying the primary cross-linking reaction with $POCl_3$ instead of other known reagents such as sodium trimetaphosphate (STMP), an optimized primary cross-linked network density is achieved which can be easier and more efficient cross-linked in a second cross-linking step.

The recovered starch is preferably washed e.g. with water and subsequently dried to a moisture content of preferably below 20 wt %, more preferably below 15 wt %, most preferably below 12 wt %. The dried, primary cross-linked starch is mixed with a powder of STMP to obtain a dry powder mix, wherein STMP is added in amounts of between 0.7 and 1.2%, more preferably between 0.9 and 1.2%, most preferably between 1.0 and 1.2% based on the dry weight of the starch. The present inventors observed that having an accurate dosage of the STMP reagent as well as an optimum mix with the starch before the cross-linking reaction is crucial in achieving the optimum rheological behavior of the inventive starch. Dry blending instead of solution mixing, of STMP powder with dried primary cross-linked starch powder, e.g. in a powder mixing device, has proven to be beneficial in imparting a consistent and well defined cross-linking level and distribution in the inventive starch resulting in optimum properties thereof. The dry powder mix of primary cross-linked starch and STMP has preferably a content of at most 30% moisture, more preferably at most 20% moisture, most preferably at most 15% moisture.

The dry powder mix is then reslurried in water to achieve a slurry having a dry solids content of preferably at least 30%, more preferably at least 35%, most preferably at least 40%. Preferably, said dry solids content is between 30% and 65%, more preferably between 40% and 60%, most preferably between 45% and 55%. The pH of the slurry is then adjusted to a pH of at least 9.0, preferably of at least 9.3, most preferably of at least 9.5. Cross-linking reactions with STMP are typically run under neutral to moderate alkaline conditions, i.e. at a pH between 7.5 and 8.5. The common understanding in the art is that cross-linking the starch with STMP at pHs higher than 8.5 reduces the starches' ability to (long-term) stabilize a food product containing thereof. However, the present inventors observed that using a STMP cross-linking reaction under a pH of at least 9.0 in combination with the specific previous process conditions as detailed hereinabove, proves beneficial to ensure an optimum level and distribution of secondary cross-linking in the inventive starch, which in turn provides the starch with an excellent long-term stability. Preferably said pH is between 9.0 and 10.0, more preferably between 9.3 and 9.8, most preferably between 9.5 and 9.7. Preferably, sodium carbonate is used to adjust the pH of the slurry, in an amount of preferably between 0.05 and 0.5%, more preferably between 0.1 and 0.4%, most preferably between 0.2 and 0.3% relative to the total mass of the slurry. Temperatures in the reslurry step should preferably be maintained at less than about 25° C. so as to ensure that further primary crosslinking does not occur on the granular, primary cross-linked starch prior to the drying step.

The starch is then cooked to pregelatinize it and the slurry is dried. Cooking and drying can take place simultaneously or sequentially, preferably they are carried out simultaneously. During pregelatinization the starch loses its polarization cross, due to swelling and eventual bursting. Preferably, the pregelatinization is carried out under such conditions that the starch loses its granular structure due to swelling and bursting. Any technique can be used for drying and pregelatinization such as drum drying, spray drying, extrusion and jet cooking, or combinations thereof. Said slurry is preferably dried to a moisture level of below about 10%, more preferably below about 7%, preferably by feeding it directly onto a drum dryer. Preferably, the starch is pregelatinized during the drying while the secondary crosslinking reaction takes place favored by the STMP reagent. In case a drum dryer is used, said drum dryer may be of an atmospheric type and may constitute either a single or double drum. In the drum drying procedure, a slurry of starch is passed over heated rollers which raise the temperature of the slurry above the gelatinization point of the starch while also evaporating the water therefrom so as to ultimately yield dry, solid particles of pregelatinized starch. In accordance with a preferred embodiment of the invention, the slurry is fed onto a main drum with a multi-feed applicator rolls through perforated pipes or oscillating arms from a tank or vat provided with an agitator. Generally, the drum or drums are steam heated to a temperature above the gelatinization point of the starch, e.g. a temperature within the range of about 135° C.-175° C., with the capacity of the drum dryer being proportional to the effective drying area, i.e. the total surface from which drying can take place. Thus, the aqueous slurry is fed into the nips formed by the main heated drum and applicator rolls wherein it gelatinizes and forms a rolling cylinder of starch paste thereby effecting secondary cross-linking favored by the STMP reagent while also evaporating the water therefrom so as to ultimately yield dry, solid particles of pregelatinized dually cross-linked starch. It will be recognized that the drum drying conditions, e.g. temperature and drum speed, under which the starch is gelatinized, cross-linked and dried in this secondary reaction step will vary according to the particular starch base, the degree of crosslinking desired and the ultimate end-use application.

After drying, the dried starch product (usually in the form of a sheet) is recovered, e.g by doctoring from the drum, and preferably flaked, ground or milled to the desired mesh depending upon the end-use requirements, employing procedures and apparatus well known to those skilled in the art.

The invention further relates to food products containing the inventive starch. Examples of food products include without limitation fruit compotes; sauces and preparations based on tomatoes; meat sauces; gravies; baby foods; puddings; cereals; fruit-juices and fruit-drinks; fruit sauces such as apple sauce; confectionary such as textured gum drops; cookies, crackers, cakes and pastries comprising fruits; soups but also dry powdered mixes which may be reconstituted with water. Thus, in tomato sauce, for example, the presence of the inventive starch enables the resulting sauce to exhibit the rich, natural texture of the fresh, raw tomato.

In order to incorporate the inventive starches into a food product, they may merely be put into the form of an aqueous slurry which may contain at least about 10% of water, as based on the total weight of components in the final food product. As an optional component, these slurries may also contain a conventional starch thickener, such as inhibited tapioca or a waxy maize starch; the resulting slurry, either with or without the conventional thickener, thereupon being added to the various non-starch, food base ingredients. The inventors observed however that due to the excellent rheological behavior of the inventive starch, the conventional thickeners may be left out of the food product formulation, contributing therefore to a total cost reduction thereof.

As previously mentioned, the inventive starch is less or even not adversely affected by any of the extreme food processing, and particularly the sterilization, techniques to which the food products are typically subjected when they are to be packaged in sealed containers such as tin, cans or jars. Such sterilization techniques include stationary cooking and retorting, i.e. pressure cooking at a combination of temperatures and pressures in excess of about 100° C. and one atmosphere: the latter method being of particular significance in the food industry.

In addition, food systems containing known starch and having pH levels below about 4.5 are typically sterilized by being cooked at atmospheric pressure, at temperatures less than about 100° C. to prevent the degradation of the starch's properties. The inventors observed that that inventive starch allows the use of sterilization temperatures higher than 100° C. which may lead to an increased shelf life of the food product or reduced sterilization costs. The invention therefore relates to a method of sterilizing a food product containing the inventive starch and having a pH of below 4.5 at a temperature above 100° C.

In a preferred embodiment, the invention relates to a tomato-based sauce containing the inventive starch in an amount of between 2% and 70%, preferably between 3.5 and 50%, most preferably between 5% and 25% based on the total sauce weight. The sauce of the invention can be prepared by admixing the inventive starch with tomato solids plus other optional ingredients such as fillers, flavors, bodying agents, thickeners such as starch not in sponge form, etc. The inventors observed that the amount of tomato solids which are responsible for providing the pulpy aspect in the sauce can be reduced by the addition of the inventive starch without sacrificing the pulpy texture of the sauce. The tomato solids may be present in any form, e.g., tomato powder and/or freeze-dried tomato flesh or pulp.

The invention further relates to a beverage, a dairy product, a sauce, a mash, a pulp, a puree, a dressing, a dip, a soup and a filling containing the inventive starch. In particular, the invention relates to a fruit filling for a bakery product, said filing containing the inventive starch, as well as to a backer product containing said filling. The invention also relates to a yoghurt, a quark, a cream, or a milk beverage containing the inventive starch.

The invention further relates to a food product containing the inventive starch, wherein the food product is chosen from the group consisting of compotes; sauces and preparations based on fruits and vegetables, in particular tomatoes; meat sauces; gravies; baby foods; puddings; cereals; fruit-juices and fruit-drinks; fruit fillings and fruit sauces such as apple sauce; confectionary such as textured gum drops; cookies, crackers, cakes and pastries comprising fruits; soups; and dry powdered mixes which may be reconstituted with water.

The invention also relates to a dehydrated product preferably in a powder form, said product being reconstitutable with a cold or hot aqueous liquid to a pulpy textured product, said dehydrated product containing the inventive starch. The dehydrated product may be reconstituted into a pulpy textured sauce, mash, pulps, puree, dressing, dip, beverage or soup when rehydrated. Preferably, the dehydrated product is a vegetable dehydrated product, i.e. a product encompassing any vegetable according to the culinary meaning such as leaf-vegetable, stalk-vegetable, bud-vegetable, fruit-vegetable, root-vegetable, or tuber-vegetable and combinations thereof, but it also concerns fruits. The dehydrated product may further contain bodying agents, fillers, flavorings or the like. Using the dehydrated product of the invention, it is possible to enable the manufacture of a rich and pulpy vegetable sauce, soup, purée or the like by simply adding water.

Methods of Measurement

Moisture content ("MC"): The moisture content was determined by weighing a sample placed in a pre-dried anhydrous recipient and subsequently heating the recipient containing the sample overnight (about 10 hours) in a ventilated oven at 105° C. An oven with circulating fans is preferred over a convection oven. The moisture content (in wt %) was calculated as $100 \times (W_1-W_2)/W_1$ where $W_1$ was the weight of the sample before drying in the oven and $W_2$ was the weight of the resulted dried sample. The weight was measured with a balance able to measure down to at least 0.01 grams. The same method can be applied to determine the dry solids content ($W_2$) of an aqueous sample.

pH: can be measured with any known pH metering device. It is preferred that the device is calibrated at the beginning of the measurements in accordance to manufacturer's instructions. Cole-Parmer for example offers a range of pH meters able to measure pHs between −2 and 16 (see Oakton pH 700 range).

Viscosity measurements: The viscosity profile of a starch sample in a buffer solution of pH 3.0 was determined using a Brabender Viscograph®-E device. The device was calibrated and adjusted according to the described procedure by Brabender. A refrigerated water bath, set at 15° C., was connected to the device in order to ensure for a correct application of the desired temperature profile. Titrisol® (Merck, Cat. Nr 109883) was used as buffer solution to ensure for a constant pH of 3.00±0.02. The starch was dispersed by hand in the buffer solution at a temperature of about 30° C., in a weight amount of 5.5%, under good agitation and by using a mixing spoon or a mixing rod. To determine the viscosity (in BU), the following parameters were used:

Cartridge: 350 cmg
Revolution speed: 75 rpm
Temperature profile: total time is 90 min.
  starting temperature: 50° C.
  heating rate: 1.5° C./min
  heating up to 95° C.
  30 min holding time at 95° C.
  cooling rate: 1.5° C./min
  final temperature: 50° C.

The following viscosities were determined:
Peak viscosity (PV): Viscosity at the peak, if any.
Top viscosity (TV): Viscosity measured at the moment when the temperature reaches 95° C.
Hot paste viscosity (HPV): Viscosity after 30 min at 95° C.
End viscosity (EV): Viscosity measured after cooling at the moment when the temperature reaches 50° C.
Top viscosity breakdown (TVB): TVB-TV-HPV.

Without being however limited thereto, the practice and method of operation of the invention together with additional objects and advantages thereof will be best understood from the following examples, comparative experiments and figures.

Example 1

Sodium hydroxide was added to a water slurry of native, non-pregelatinized, granular corn starch at about 40% dry solids and about 30° C., until the total amount of sodium hydroxide was 0.7% of the weight of the starch. The pH of the slurry was in the range of 11.1-11.3.

$POCl_3$ in an amount of 0.03% based on the weight of the starch was added and allowed to react for about 30 minutes at a temperature of 30° C. The temperature of 30° C. ensured that the starch will not swell during the reaction and will maintain its granular state. After reaction, the batch was neutralized to a pH of 5.5 with hydrochloric acid. The obtained primary cross-linked starch was then recovered, washed and dried to a powder containing about 12% moisture.

The primary cross-linked starch powder was mixed with a powder of sodium trimetaphosphate (SMTP) to obtain a dry powder mix. The amount of SMTP was 1.2 wt % based on the total weight of the dry starch. The dry powder mix was re-slurried in water at room temperature to an anhydrous solids concentration of 37% and the pH of the slurry was adjusted to 9.5 with sodium carbonate (about 0.27 wt % based on the weight of the slurry). The slurry was drum dried using steam at about 8.5 bar pressure. During the drum drying, the starch was pregelatinized and a second cross-linking reaction favored by the STMP reagent took place. The dried sheet was removed from the drum surface and milled to a coarse flake such that no more than 28% by weight passed through a 100 mesh U.S. standard sieve. The Brabender curve characteristic to the resultant dually cross-linked starch is shown in FIG. 1.

Comparative Experiment 1

The pulpiness and rheological profile of a starch made according to Example 2 of U.S. Pat. No. 4,291,646 was used for comparison. The starch was characterized by a relatively high viscosity curve and produced a pulpy textured paste.

According to U.S. Pat. No. 4,291,646, a water slurry of unmodified corn starch at about 36% solids and 35° C.-38° C. is treated with 1.15% sodium chloride based on the weight of starch solids. A water solution containing 3% by weight sodium hydroxide is added until the total amount of sodium hydroxide is 0.6% of the weight of the starch. The pH should be in the range of 11.1-11.3. Sodium trimetaphosphate in an amount of 0.15% based on the weight of the starch is added and allowed to react for about 3 hours. After reaction, the batch is neutralized to the pH range of 5.0-5.5 with hydrochloric acid. The starch is then recovered, washed and dried to a powder containing about 12% moisture.

The cross-linked starch is re-slurried in water to an anhydrous solids concentration of 38-42% and then 0.5% sodium chloride and 0.2% sodium trimetaphosphate is added thereto. The pH of the slurry is adjusted to the range of 7.8-8.1 with sodium carbonate, and the starch slurry is drum dried using steam at about 100 psig pressure. The dried sheet is removed from the drum surface and milled to a coarse flake such that no more than 28% by weight passed through a 100 mesh U.S. standard sieve. The Brabender curve characteristic to the resultant dually cross-linked starch is shown in FIG. 1.

Comparative Experiment 2

Sodium hydroxide was added to a water slurry of native, non-pregelatinized, granular corn starch at about 40% dry solids and about 30° C., until the total amount of sodium hydroxide was 0.7% of the weight of the starch. The pH of the slurry was in the range of 11.1-11.3.

$POCl_3$ in an amount of 0.03% based on the weight of the starch was added and allowed to react for about 30 minutes at a temperature of 30° C. The temperature of 30° C. ensured that the starch will not swell during the reaction and will maintain its granular state. After reaction, the batch was neutralized to a pH of 5.5 with hydrochloric acid. The obtained primary crosslinked starch was then recovered, washed and dried to a powder containing about 12% moisture.

The primary cross-linked starch powder was mixed with a powder of trisodium citrate ($Na_3C_6H_5O_7$) to obtain a dry powder mix. The amount of trisodium citrate was 6.5 wt % based on the total weight of the dry starch. The dry powder mix was re-slurried in water at room temperature to an anhydrous solids concentration of 37% and the pH of the slurry was adjusted to 6.0 with sodium carbonate. The slurry was drum dried using steam at about 8.5 bar pressure. The dried sheet was removed from the drum surface and milled to a coarse flake such that no more than 28% by weight passed through a 100 mesh U. S. standard sieve. The Brabender curve characteristic to the resultant dually cross-linked starch is shown in FIG. 1.

Comparative Experiment 3

The Brabender viscosity profiles of commercially available modified corn starches known to provide pulpy textures were investigated according to the described methodology. The Brabender curves characteristic thereof are shown in FIG. 1.

Discussion of the Rheological Profiles

In FIG. 1, the viscosities (101) of the investigated starches expressed in BU versus time (102) are shown. The temperature profile was also plotted as the dashed curve (103). The HPV (104-2) and EV (104-3) developed by the starches of Example 1 (prepared in accordance with the invention) were significantly higher than those (105-2) and (105-3), respectively, achieved with the starch of U.S. Pat. No. 4,291,646 (Comparative Experiment 1). Although the TV (104-1) of the starch of Example 1 was at a similar level with that (105-1) of the starch of U.S. Pat. No. 4,291,646, the inventive starch had a significantly lower TVB. The inventive starch showed significantly less viscosity breakdown when heated for 30 min at 95° C. under acidic conditions (pH 3.00) and retained its viscosity better than the starch of U.S. Pat. No. 4,291,646. By cooling the starch to 50° C. over a period of time of 30 min, the EV (104-3) of the inventive starch was significantly higher than the EV (105-3) of the starch of U.S. Pat. No. 4,291,646.

The TV, HPV and EV characteristic to the starch of Example 1 were also significantly higher than those achieved with the starch produced according to Comparative Experiment 2 (106), while the TVB was significantly lower. The same was observed also when the starch of Example 1 was compared with a commercially available starch (107).

While it might be considered that the textural properties of a starch would be improved without the necessity for dual crosslinking by merely increasing the level of the primary crosslinking, such improvements have not, in practice, been observed. When the primary reaction was continued for a longer period of time using additional reagent, a Brabender viscosity curve such as (107) was obtained. The present inventors concluded that excessive crosslinking may result in a highly cross-linked starch which is unable to adequately cook and may be characterized by low viscosity properties when used in food products.

Example 2 and Comparative Experiment 4

Ketchup samples were prepared according to following recipe and processing conditions. All dry ingredients were blended together as follows: 2% of starch of Example 1 was mixed with 18% sugar, 2% of modified starch (C☆Tex 06214 by Cargill®), 1.5% NaCl, and 0.3% critic acid monohydrate. 51.2% water was mixed with 5% vinegar solution (7%) and 20% tomato concentrate. The dry and wet ingredients were mixed under sufficient stirring and the whole formulation was heated to 98° C. and held at this temperature for 320 min while stirring at 130 rpm. The obtained ketchup samples were subsequently cooled to room temperature in a water bath. The ketchup sample was visually inspected after 24 hours to assess pulpiness (FIG. 2A).

A recipe containing 30% tomato concentrate and no starch of Example 1 was used as reference ketchup (Comparative Experiment 4). All other ingredients were similar as the ones in Example 2 and same processing was applied. The reference ketchup sample was visually inspected after 24 hours to assess pulpiness (FIG. 2B).

Figure 2B:
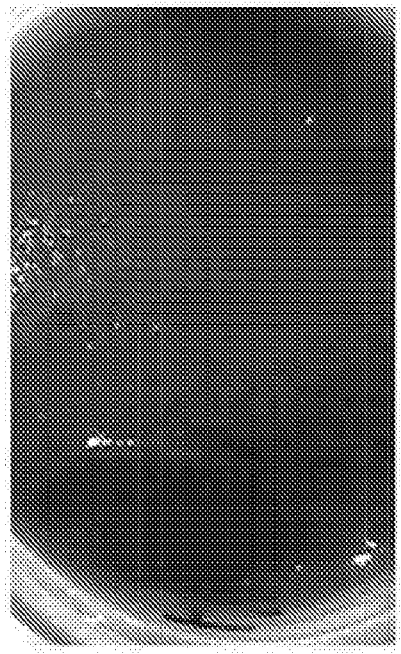
FIG. 2 shows pictographs of the pulpy texture of ketchup samples containing the starch of the invention (FIG. 2A) and known starches (FIG. 2B).
Figure 2A:
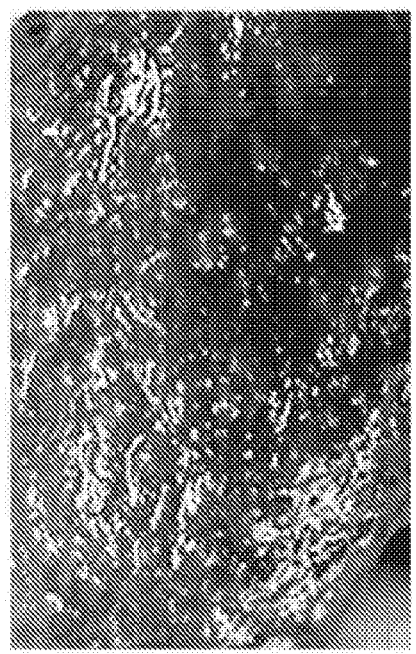

Pictographs of the obtained ketchup of Example 2 and Comparative Experiment 4 are shown in FIGS. 2A and 2B, respectively. Therein it is clearly observed that the inventive starch was able to withstand a pasteurization step (20 min at 98° C.) while maintaining a pulpy appearance and a thick viscous texture thus showing an excellent heat resistance. In contrast with the inventive starch, the known starches which under mild processing conditions deliver a pulpy texture to food products, when processed under the above mentioned extreme conditions of heat, acidity and temperature followed by pasteurization, failed to develop the pulpy texture. The texture obtained after processing known starches was smooth, without any visible pulpiness. Moreover, the known starches largely lost their viscosity.

Examples 3 and 4 and Comparative Experiments 5 and 6

Figures 4A, 4B, 4C, 4D:
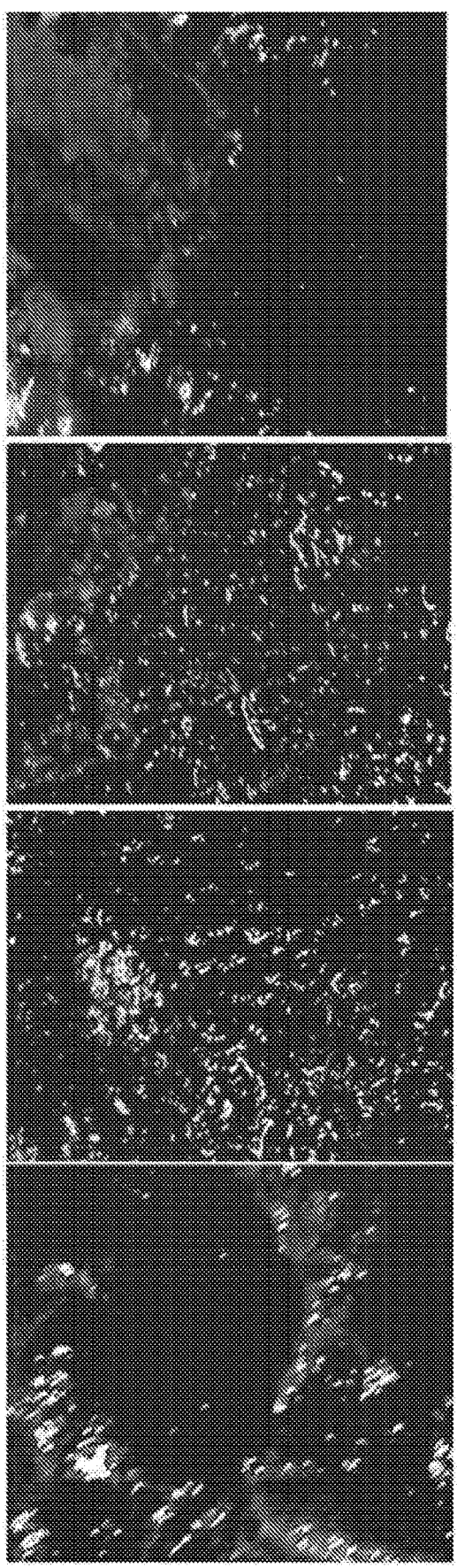

An Italian style pasta sauce was made with the ingredients of Table 1 as follows: all ingredients were blended and heated to 90° C., kept for 30 seconds at 90° C. while stirred at 100 rpm. The sauce was filled in cans and sterilized in a rotatable sterilizer at 10 rpm to a F0=8. The samples were visually inspected before and after sterilization to assess pulpiness (FIGS. 3 and 4).

TABLE 1

|  | CE.5 | CE.6 | CE.7 | CE.8 |
|---|---|---|---|---|
| Polpa with onion (Elvea 7.77°) | 35.50 | 34.0 | 30 | 30 |
| Cubetti with Italian herbs (Elvea 7.57°) | 35.50 | 34.0 | 30 | 30 |
| Tomato concentrate (28°) | 15 | 10 | 10 | 10 |
| Starch of Example 1 | — | 2 | 2 | — |
| C☆Tex 06203 | 1 | 1 | 1 | 1 |
| Dry substance coming from tomato | 9.7 | 8.0 | 7.4 | 7.41 |
| Reduction of tomato ingredients |  | 10% | 19% | 19% |

The addition of the inventive starch of Example 1 enhanced the pulpy aspect of the Italian style pasta sauce (FIGS. 3B and 3C) in comparison with a sauce having a large tomato concentrate level and no inventive starch (FIG. 3A). When no inventive starch was applied (FIG. 3D) and tomato concentrate levels were lowered, the sauce became thin and fluid. These experiments, demonstrate that the inventive starch can be used successfully to replace tomato paste in Italian style pasta sauce, it offered exceptional pulpiness prior to sterilization and maintained the pulpiness throughout and after the sterilization.

Example 5 and Comparative Experiment 7

An 80 brix bakery fruit filling was prepared using the ingredients indicated in Table 2:

| Ingredients | EXAMPLE 5 | COMPARATIVE EXPERIMENT 7 |
|---|---|---|
| sucrose | 41% | 44% |
| Glucose 60DE | 40% | 40% |
| glycerol | 5% | 5% |
| Fruit pulp | 5% | 5% |
| Fruit extract | 2% | 2% |
| Starch of Example 1 | 3% | 0% |
| C☆Polar 06748 | 10% | 1% |
| Up OF 959CSB | 0.5% | 0.5% |
| Citric acid | 0.5% | 0.5% |
| Water | Qsp | QsP |

The pectin was blended with 30 wt % of the total sucrose and the mix was dispersed in hot (60-65° C.) water under stirring to obtain a pectin solution. The starches were blended with the remaining sucrose and the remaining components except the citric acid and the mix was heated to boiling (about 95-100° C.). The pectin solution was then added to the mix together with the citric acid (in 50 wt % solution). The product obtained was used as fruit filling and was filled inside a bakery product at 90° C.

It was observed that in addition of delivering pulpiness, the starches of the invention help improving the overall water binding and hold. This helps the fruit to adhere and remain in place when added to a bakery product such as a biscuit or pastry.

Example 6

The starches of the invention were added to an orange drink mix. It was observed that the addition of 3.5 g/L of the starch mimics citrus pulp from a visual and sensorial point of view.

Example 7

A quark was prepared using the ingredients indicated in Table 3:

| Ingredients | % |
|---|---|
| Cream (40% fat) | 10.5 |
| Sucrose | 9 |
| Skim milk powder | 5.7 |
| Apple Juice Concentrate (65 Bx) | 1.5 |
| Starch of Example 1 | 2.5 |
| Mesophil culture | QS |
| Rennet | QS |
| Strawberry flavor & red colour | QS |
| Skimmed milk | to 100% |

All ingredients were blended except the culture, rennet, flavor, colour and the starch of the invention. The blend was heated to 95° C. for 5 minutes and subsequently cooled down to 72° C. and homogenized at 220 bar. The starch was then added and the mix was pasteurized. The culture, rennet, flavor and colour were added to the pasteurized mix and incubated until the pH was 4.65. The products was stared in a refrigerator. The obtained quark had a novel texture which provided a refreshing juicy whole fruit experience with an excellent pulpiness.

All investigated starches provide pulpy textures to food products, however, none of the known starches showed an optimum rheological profile. Only the starch of Example 1 succeeded in providing both the pulpy structure and the rheology needed for food products produced or processed under extreme conditions of acidity, heat and shear.

The inventors also surprisingly observed that the pulpiness of the food products containing the inventive starches was stable even when said food product was processed under extreme conditions of temperature, pH and agitation. In particular they observed an optimum stability of the starch responsible for the pulpy texture. In addition, the size of pulpy structures was largely maintained during the food product's processing and even enhanced pulpiness was observed by additional processing (e.g. additional heating step). Besides the textural effect, the inventive starch was able to positively affect the viscosity and stability of the food products with the exceptionally high hot paste viscosity and end viscosity. The desired enjoyment value of the food product was thus increased by the inventive starch.

The heavy-bodied, "pulpy" or grainy texture which developed and was maintained during extended retorting in both high and low pH food products was more pronounced than for food products containing known starches. This improvement in properties is highly desirable in food products such as tomato sauce where a thick, naturally "pulpy" texture and "mouthfeel" are particularly important.

I claim:

1. A pregelatinized starch having a Brabender hot paste viscosity (HPV) ranging from 230 to 280 BU when measured at a pH of at most 4.5 and a Brabender top viscosity (TV) of at least 150 BU when measured at a pH of at most 4.5.

2. The starch of claim 1 wherein the starch is non-granular.

3. The starch according to claim 1 wherein the Brabender HPV ranges from, at least 250 BU to 280 BU.

4. The starch according to claim 1 wherein the Brabender HPV is measured at a pH of 3.0.

5. A food product containing the starch of claim 1, wherein the food product is chosen from the group consisting of compotes; sauces and preparations based on tomatoes; meat sauces; gravies; baby foods; puddings; cereals; fruit-juices and fruit-drinks; fruit sauces such as apple sauce; confectionary such as textured gum drops; cookies, crackers, cakes and pastries comprising fruits; soups; and dry powdered mixes which may be reconstituted with water.

6. The starch of claim 1 having a Brabender top viscosity breakdown (TVB) of at most 30 BU when measured at a pH of at most 4.5.

7. The starch of claim 1 having a Brabender end viscosity (EV) of at least 290 BU when measured at a pH of at most 4.5.

8. The starch of claim 1 having a Brabender end viscosity (EV) and a Brabender top viscosity (TV), wherein EV>TV.

9. A pregelatinized starch having a Brabender hot paste viscosity (HPV) ranging from 230 to 280 BU when measured at a pH of at most 4.5 and a Brabender top viscosity breakdown (TVB) of at most 30 BU when measured at a pH of at most 4.5.

10. The starch of claim 9 having a Brabender end viscosity (EV) of at least 290 BU when measured at a pH of at most 4.5.

11. The starch of claim 9 having a Brabender end viscosity (EV) and a Brabender top viscosity (TV), wherein EV>TV.

12. A pregelatinized starch having a Brabender hot paste viscosity (HPV) ranging from 230 to 280 BU when measured at a pH of at most 4.5 and a Brabender end viscosity (EV) of at least 290 BU when measured at a pH of at most 4.5.

13. The starch of claim 12 having a Brabender end viscosity (EV) and a Brabender top viscosity (TV), wherein EV>TV.

14. A pregelatinized starch having a Brabender hot paste viscosity (HPV) ranging from 230 to 280 BU when measured at a pH of at most 4.5 and a Brabender end viscosity (EV) and a Brabender top viscosity (TV), wherein EV>TV.

* * * * *